May 16, 1939.  E. L. DAYTON  2,158,222
COMPENSATING VALVE MECHANISM
Original Filed Nov. 17, 1936  2 Sheets-Sheet 2
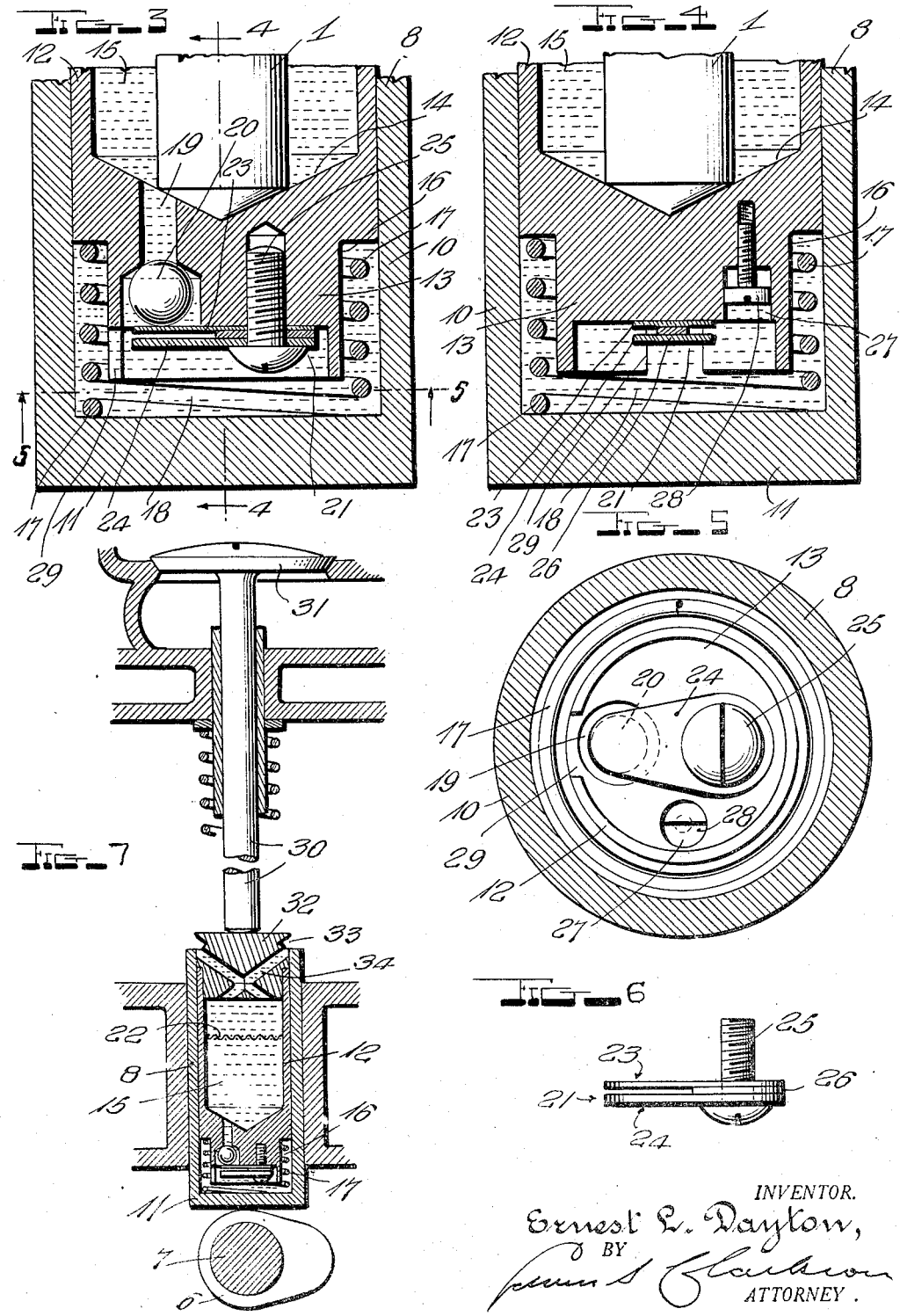
INVENTOR.
Ernest L. Dayton,
BY
ATTORNEY.

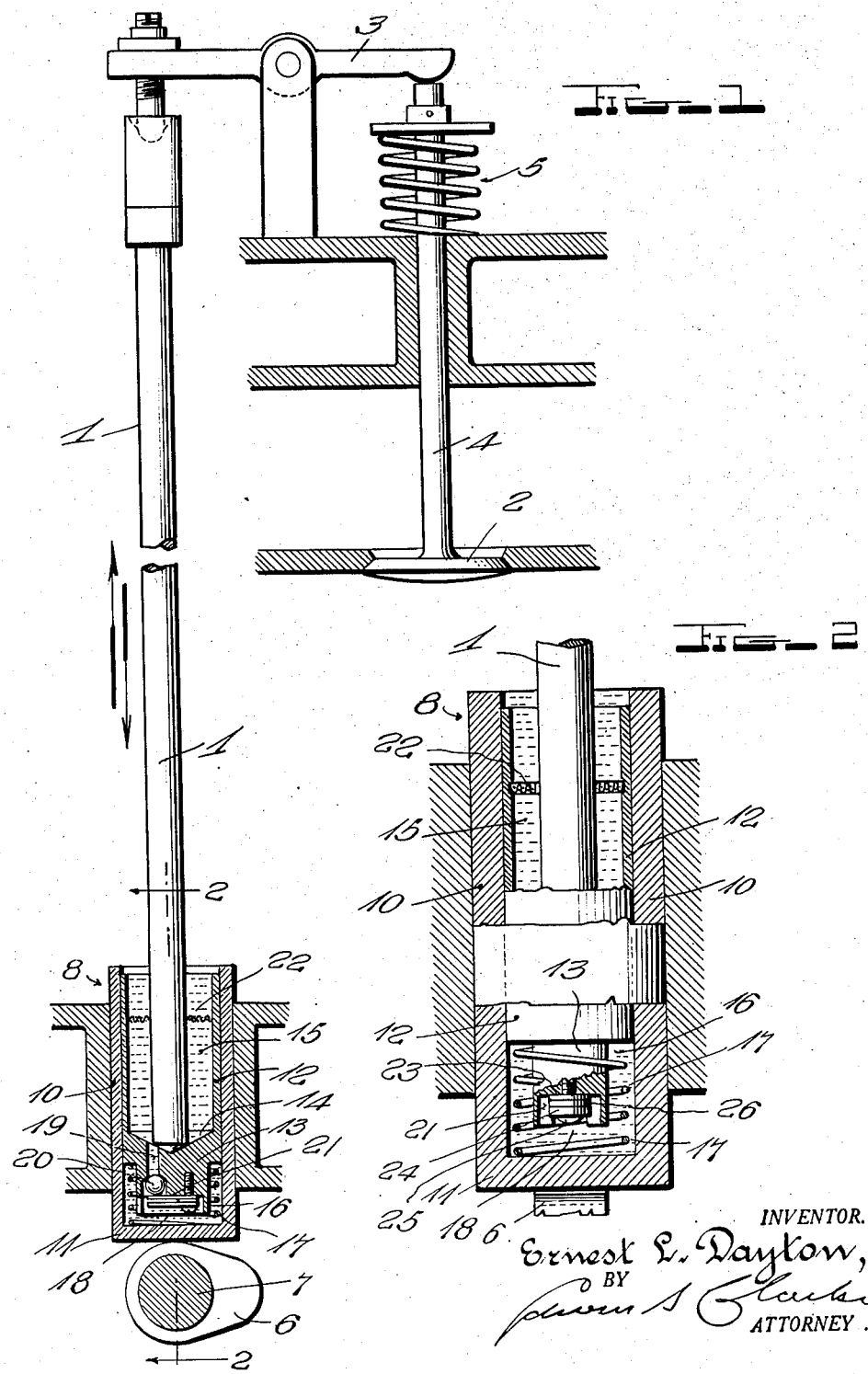

Patented May 16, 1939

2,158,222

UNITED STATES PATENT OFFICE 2,158,222

COMPENSATING VALVE MECHANISM

Ernest L. Dayton, Detroit, Mich.

Application November 17, 1936, Serial No. 111,292
Renewed October 5, 1938

5 Claims. (Cl. 123—90)

This invention relates to compensating valve mechanisms for power delivery devices, such as for the valve tappets of gas engines or working parts of jacks, etc., which deliver power in one direction and in which the use of compensating means is desirable or necessary in order to compensate for looseness due to wear or lost motion of working parts.

One object of the invention is to provide a compensating means or compensating valve mechanism which will automatically compensate for looseness or lost motion due to play or other distance variations between coacting working parts.

Another object of the invention is to provide a compensating means or valve mechanism which is particularly adapted for use in connection with the tappet valves of gas engines whereby any variations in length of the valve stem or push rod will result in a compensating variation in the length of the tappet, so that lost motion will be avoided with its accompanying objectionable features, such as the variation of period and timing of the valve opening and the noise and wear of the loose parts.

Still another object of the invention is to provide a compensating means or valve mechanism of this character which when used in a combustion engine is noiseless, which is simple of construction, durable, quick acting, not liable to get out of order and which operates without shocks or jars incident to the coming together of working parts.

Still another object of the invention is to provide a compensating means or valve mechanism of the character described embodying a check valved hydraulic type of compensating means wherein provision is made for freeing the valve in the event of its sticking and governing the action of the valve according to its inertia at different engine speeds.

Still another object of the invention is to provide a compensating means or valve mechanism of the character described which automatically adjusts itself to different forms of lifting cams and regulates the time period of opening of the check valve according to the shape of the surface of the lifting cam.

In the illustrated embodiment, in which the invention is shown in connection with the valve operating mechanism of a gas engine, the compensating means or valve mechanism is shown in the form of a tappet employed for transmitting motion from a lifting cam to a rod for operating a valve through the intermediary of a rocker arm, or for transmitting motion directly to the stem of a valve. The purpose of the invention as thus employed is to provide means to compensate for wear between the prime mover or cam and the member which contacts therewith, between the valve stem and its contacting member, and between the tappet valve and its valve seat, and also for any expansion and contraction of the stem which may occur, in order that the valve will be properly seated at each revolution of the cam and each time that the low part of the cam comes in engagement with the tappet. By this means proper and complete closing of the valve will be ensured, defective actions caused by incomplete closing of the valve avoided, noise eliminated, and the general efficiency of the engine increased. As stated, however, my invention may also be employed for similar uses in lifting jacks or other devices for delivering power in one direction from a power element to elements actuated thereby, where the use of a compensating means or valve mechanism of this character is desirable.

In the accompanying drawings illustrating the invention:

Fig. 1 is a sectional view of a gas engine valve provided with a valve lifting compensator embodying my invention, the valve shown being of that type in which a lifter rod transmits motion to the valve stem of an overhead valve by means of a rocker arm.

Fig. 2 is a sectional view through the compensator element on the line 2—2 of Fig. 1.

Fig. 3 is a sectional view similar to Fig. 1 through the lower portion of the compensator on an enlarged scale.

Fig. 4 is a sectional view on line 4—4 of Fig. 3.

Fig. 5 is a horizontal section on line 5—5 of Fig. 3.

Fig. 6 is a detail view of the differential spring.

Fig. 7 is a view similar to Fig. 1 showing the invention applied to the stem of an L head type of valve.

Referring now more particularly to Figs. 1 to 6, inclusive, of the drawings, 1 designates a valve operating rod, 2 a tappet valve, 3 a rocker arm for transmitting motion from the rod to the stem 4 of the valve, 5 a spring for normally holding the valve closed, and 6 a cam on the cam shaft 7 for engagement with the tappet member 8 for transmitting motion to the rod 1 to open the valve against the resistance of its closing spring 5. These parts with the exception of the member 8 may be of any of the constructions in common use.

The member 8 provides a compensating valve means constructed in accordance with my invention. It comprises an outer casing or cylinder 10 closed at its lower end 11, which is engaged by the cam 6, and open at its upper end. Fitted to slide in this casing or cylinder is a plunger 12. This plunger receives the lower portion of the rod 1 and has a bottom wall 13 against which the lower end of the rod bears.

The contacting surfaces of the wall and rod are preferably cone-shaped or beveled, as shown at 14, in such manner as to hold these parts in engagement and centered with relation to each other. Above the wall 13 the plunger is hollow or formed with a cavity providing an oil reservoir 15. The lower end of the plunger is formed with an external annular recess 16 to receive a coiled spring 17, bearing at its upper end against the top wall of the recess and at its lower end against the bottom of the cylinder 10. This spring normally holds the bottom of the plunger slightly elevated above the bottom of the cylinder to provide an oil well or chamber 18 therebetween. It serves to lift the plunger 12 as far as permitted to keep the upper end of the rod 1 in contact with the rocker arm 3 or a contact part carried thereby at all times. This spring is much weaker than the spring 5 so that it at no time interferes with the normal function of the latter. The lengths of the rod 1 and plunger 12 are such that the plunger is always supported, either by oil in the well 18, or the spring 17, or both, above the bottom of the cylinder 10.

The oil reservoir 15 and oil well 18 are in communication through a restricted passage 19 in the wall 13 for the gravity flow of oil from the reservoir to the well. This passage is enlarged at its lower portion to receive a vertically movable ball check valve 20, which controls the flow of oil through said passage. The valve 20 is normally held seated and restricted in its opening movement by a differential spring device 21 of the construction hereinafter described, which adapts said valve to open to different degrees and controls its inertia kick back at different speeds of revolution of the cam 6.

The plunger 12 fits reasonably tight in the cylinder 10, and any upward movement of the plunger with respect to the cylinder is accompanied by an outflow of oil from the reservoir 15 through the passage 19 to the well 18, the degree of this flow being controlled by the action of the check valve 20. The oil which flows through the passage 19 into the well 18 can not return to the reservoir through said passage because of the check valve 20, and consequently the elongation of the tappet by the relative upward movement of the plunger in the cylinder is maintained so that the valve will receive the full throw of the cam. The rapid operations to which the tappet is subjected by the action of the cam, whereby the tappet is subjected to considerable pressure, will cause a slow leakage of oil around the plunger and upwardly between the plunger and the cylinder to the open top of the plunger, into which the oil thus displaced from the well will flow back to the reservoir 15. By this means a slow bleeding or leakage action is effected to permit the tappet to contract as the parts elongate in a working action through heat or other cause, so as to avoid holding the valve off its seat while not permitting play or lost motion. Should the bleeding allow of the contraction of the tappet to a degree greater than necessary for a compensating action, any tendency to play will allow the spring 17 to slightly lift the plunger with respect to the cylinder and so permit sufficient oil to pass the check valve to restore the tappet to the length necessary for making a close fit between the cam and the valve rod or valve stem. The expansion of the parts in a working action is gradual, so that the tappet may readily adjust itself for a compensating action in its self elongation or contraction.

A screen or filter 22 of woven wire or other suitable material is disposed within the upper portion of the reservoir to filter the oil fed into the reservoir, as well as to prevent the admission of dirt or other foreign particles into the oil contained portion of the reservoir. Should for any reason the supply of oil become exhausted, or, for any other reason, a hydraulic jack action fail, the tappet may be compressed by the action of the cam only to the extent allowed for the play between the tappet and valve rod, that is to say, the distance allowed in the adjustment of the working parts. This distance will, of course, vary as the effective length of the tappet varies to compensate for contraction and expansion of the parts, but any failure of the hydraulic jack action will only allow that amount of play which is customary and determined by ordinary adjustments.

The differential spring 21 comprises a plurality of spring members successively brought into play at different engine speeds to regulate the action of the valve 20. Any suitable construction and number of springs may be employed for the purpose. In the present instance the spring shown comprises a pair of spring members, an upper ribbon or leaf spring member 23 and a lower ribbon or leaf spring member 24, each of a definite degree of thickness and resistance to flexion. These spring members are secured at one end by a screw or other fastening device 25 to the bottom of the wall 13 of the plunger and are arranged so that their free ends underlie the valve 20, with the free end of the spring 23 bearing lightly on the valve 20. The springs are held spaced by a spacing member or washer 26 secured therewith by the screw 25 to the wall 13. The spring member 13 opposes a certain degree of resistance to the opening movement of the valve 20 within certain speed ranges of the cam 6, say up to 1000 R. P. M., at which time it is brought into contact with the spring 24, which supplements the resistance of the spring 23 to the opening movement of the valve during higher speed revolutions of the cam, say between 1000 R. P. M. and 2000 R. P. M.

It will be understood that in the operation of the device the opening of the valve 20 is caused both by vacuum created when the coiled spring 17 elongates the tappet, and also when the speed causes inertia sufficient to make the ball force down the spring 23. At the lower speeds the inertia is not considerable and the resistance of the spring 23 is sufficient to control it. At high speeds, however, the resistance of the spring 23 would be insufficient, but at this time the spring 24 is brought into play and cooperates with the spring 23 to resist the increased inertia. By this means a differential spring action is established at different speed ranges to control the inertia of kick back action of the ball valve, which varies at different engine speeds, so that a proper resistance to the opening movement of the valve will be established at all speeds and under all working conditions of the hydraulic jack action. The inertia of kick back action tends to become excessive at very high engine speeds and at times when there is no oil in the well 18, which may result from temporary sticking of the valve. Under these or other conditions the differential spring resistance on the freeing of the valve will allow the valve to open to the degree necessary for a flow of the proper amount of oil into the well and then successively govern its action to further regulate the flow. This differential spring action is an important feature of my invention in allowing and ensuring control of the valve and proper regulation of oil flow at all engine speeds.

Provided in the bottom of the plunger is an air cushioned pocket 27 which communicates with the well chamber 18. Associated with this pocket is a regulating screw 28 which is adjustable to regulate the effective depth of the pocket. The purpose of this pocket is to provide a means to further govern the motion transmitting action of the tappet to compensate for variations in the shapes of the cams employed and to time the valve opening movement accordingly. The air in this air chamber is compressed to different degrees as the valve is lifted and variably released or expanded under relative movements between the cylinder and plunger due to the varied spring tensons. The screw 28 may be adjusted to regulate the working action of this valve pocket according to the shape of the cam to slightly delay the opening of the valve on the lifting movement and cause an earlier seating of the valve when the spring tension is decreased. By this means the tappet may be adjusted for a compensating action for cooperation with cams varying slightly in contour from the normal, or that designed for action with a particular valve structure. This air pocket, and the cushioning action afforded thereby, also assists in setting up the cushioned vibratory action to release the ball valve in case it should stick to its seat, as when the plunger, due to absence of oil in the well 18, hammers against the bottom of the cylinder, thus jarring loose any dirt which may have accumulated on the valve seat and freeing the ball for a proper seating action. In view of this variable capacity of the air pocket it is ordinarily unnecessary in replacements to change the shape of the cam.

In practice the spring 21 and its fastening screw 25 are preferably seated in a bottom recess in the wall 13 so that these parts will be protected from contact with the bottom of the cylinder and so that the head of the fastening screw will not strike the bottom of the cylinder even in the event of absence of oil in the well. This recess may be separated from the recess 16 by a partition rim or wall having a cut out 29 to allow escape of air therefrom.

In Fig. 7 I have shown a modified form of the tappet to adapt it for use in directly transmitting motion to the stem 30 of an L head type of valve 31. The construction of the tappet here is the same as that previously described except that a plug 32 is provided to close the upper ends of the cylinder and plunger, which plug engages the valve stem 30. This plug is provided with an annular groove 33 to trap the leakage oil, and passages 34 are provided in the plug for flow of this oil into the oil reservoir. Through this groove and passages the reservoir may be replenished with fresh oil whenever required.

From the foregoing description, taken in connection with the drawings, the construction and mode of operation of my improved compensating valve device and its advantages will be readily understood without a further and extended description and it will be seen that a device of this character is provided which automatically takes care of all working conditions and which is simple of construction and not liable to get out of order. While, as stated, the device is particularly designed for use as a tappet for transmitting motion from a lifting cam to the valve of a combustion motor, it is to be understood that it may be employed for simple purposes in hydraulic jacks and in other mechanisms where the use of a device of its character may be found necessary or desirable. While the structural features disclosed are preferred, it will be understood that changes in the form, construction, proportions and arrangement of the parts may be made, within the scope of the appended claims, without departing from the spirit or sacrificing any of the advantages of the invention. Also it is to be understood that the device may be located anywhere in the line of communication between the motion transmitting member and the member to be operated thereby.

What I claim is:

1. A lost motion compensating valve device for transmitting motion from a motion transmitting member to a motion receiving member comprising a cylinder receiving motion from the motion transmitting member, a plunger working therein and operating to transmit motion to the motion receiving member, said cylinder and plunger having oil spaces in communication through a restricted passage for flow of the oil between the plunger and cylinder, a spring tending to separate the plunger and cylinder, a check valve operating to permit flow of oil through the passage from the plunger to the cylinder and the prevent reverse flow thereof through said passage, a spring member operating to oppose by a yielding resistance the opening of the valve at speeds up to a certain speed rate of the motion transmitting member, and a spring member brought into action to additionally oppose by a yielding resistance the opening movement of the valve at higher speeds of the motion transmitting member.

2. A lost motion compensating valve device for transmitting motion from a motion transmitting member to a motion receiving member comprising a cylinder receiving motion from the motion transmitting member, a plunger working therein and operating to transmit motion to the motion receiving member, said cylinder and plunger having oil spaces in communication through a restricted passage for flow of the oil between the plunger and cylinder, a spring tending to separate the plunger and cylinder, a check valve operating to permit flow of oil through the passage from the plunger to the cylinder and to prevent reverse flow thereof through said passage, a spring member operating to oppose by a yielding resistance the opening of the valve at speeds up to a certain speed rate of the motion transmitting member, and a second spring member underlying the first in spaced relation thereto and engaged thereby to additionally oppose by a yielding resistance the opening movement of the valve at higher speeds of the motion transmitting member.

3. A lost motion compensating valve device for transmitting motion from a motion transmitting member to a motion receiving member comprising a cylinder receiving motion from the motion transmitting member, a plunger working therein and operating to transmit motion to the motion receiving member, said cylinder and plunger having oil spaces in communication through a restricted passage for flow of the oil between the plunger and cylinder, a spring tending to separate the plunger and cylinder, a check valve operating to permit flow of oil through the passage from the plunger to the cylinder and to prevent reverse flow thereof through said passage, a spring opposing a predetermined resistance to the opening of the valve, a second spring coacting therewith to add an opposing resistance to the opening of the valve, and means spacing said springs in a determined relationship.

4. A lost motion compensating valve device for transmitting motion from a motion transmitting member to a motion receiving member comprising a cylinder receiving motion from the motion transmitting member, a plunger working therein and operating to transmit motion to the motion receiving member, said cylinder and plunger having oil spaces in communication through a restricted passage for flow of the oil between the plunger and cylinder, a spring tending to separate the plunger and cylinder, a check valve operating to permit flow of oil through the passage from the plunger to the cylinder and to prevent reverse flow thereof through said passage, an air pocket in the bottom of the plunger, and means for adjusting the size of said pocket.

5. A lost motion compensating valve device for transmitting motion from a motion transmitting member to a motion receiving member comprising a cylinder receiving motion from the motion transmitting member, a plunger working therein and operating to transmit motion to the motion receiving member, said cylinder and plunger having oil spaces in communication through a restricted passage for flow of the oil between the plunger and cylinder, a spring tending to separate the plunger and cylinder, a check valve operating to permit flow of oil through the passage from the plunger to the cylinder and to prevent reverse flow thereof through said passage, an air pocket in the bottom of the plunger, and means for adjusting the size of said pocket.

ERNEST L. DAYTON.